United States Patent
Wang et al.

(10) Patent No.: US 11,465,456 B2
(45) Date of Patent: Oct. 11, 2022

(54) SELF-MONITORING TIRE OF VEHICLE

(71) Applicant: Alpha Networks Inc., Hsinchu (TW)

(72) Inventors: Chun-Yuan Wang, Hsinchu (TW); Rong-Fa Kuo, Hsinchu (TW); Chung-Wang Lee, Hsinchu (TW)

(73) Assignee: ALPHA NETWORKS INC., Hsinchu (TW)

(*) Notice: Subject to any disclaimer, the term of this patent is extended or adjusted under 35 U.S.C. 154(b) by 925 days.

(21) Appl. No.: 15/361,906

(22) Filed: Nov. 28, 2016

(65) Prior Publication Data
US 2018/0022172 A1 Jan. 25, 2018

(30) Foreign Application Priority Data
Jul. 20, 2016 (TW) .................... 105122897

(51) Int. Cl.
*B60C 23/02* (2006.01)
*B60C 23/04* (2006.01)
*B60C 23/06* (2006.01)
*B29D 30/00* (2006.01)

(52) U.S. Cl.
CPC ...... *B60C 23/0493* (2013.01); *B60C 23/0408* (2013.01); *B60C 23/064* (2013.01); *B29D 2030/0083* (2013.01)

(58) Field of Classification Search
CPC . B60C 23/0491; B60C 23/0493; B60C 23/02; B60C 23/04; B60C 23/0408
See application file for complete search history.

(56) References Cited

U.S. PATENT DOCUMENTS

| | | | |
|---|---|---|---|
| 6,087,930 A | 7/2000 | Kulka et al. | |
| 6,147,659 A * | 11/2000 | Takahashi | B60C 9/2006 343/866 |
| 6,960,994 B2 * | 11/2005 | Tabata | B60C 23/0462 340/442 |
| 7,305,874 B2 * | 12/2007 | Ullmann | B60C 23/0408 340/442 |
| 8,983,749 B1 | 3/2015 | Singh | |
| 2002/0092345 A1 | 7/2002 | Van Niekerk et al. | |
| 2002/0093422 A1 | 7/2002 | Shimura | |

(Continued)

FOREIGN PATENT DOCUMENTS

CN 1774350 5/2006
CN 101281096 10/2008
(Continued)

OTHER PUBLICATIONS

European Patent Office, "Search Report", dated Jul. 4, 2017.
(Continued)

*Primary Examiner* — Justin R Fischer
(74) *Attorney, Agent, or Firm* — WPAT, PC

(57) ABSTRACT

A self-monitoring tire includes a tire body and a tire pressure sensor. The tire body includes a tread rubber for contact with ground, a bead for coupling to a rim, and a sidewall structure including two portions disposed at opposite sides of the tread rubber, and extending from opposite sides of the tread rubber to the bead. The tire pressure sensor is disposed between respective outward surfaces of the two portions of the sidewall structure, and secured on or embedded in either one of the two portions of the sidewall structure.

6 Claims, 4 Drawing Sheets

(56) References Cited

U.S. PATENT DOCUMENTS

| | | | | |
|---|---|---|---|---|
| 2004/0159383 | A1* | 8/2004 | Adamson | B60C 11/00 |
| | | | | 152/152.1 |
| 2006/0162435 | A1* | 7/2006 | Watanabe | G01L 9/0075 |
| | | | | 73/146 |
| 2007/0256485 | A1 | 11/2007 | Rensel et al. | |
| 2008/0139959 | A1* | 6/2008 | Miethke | A61B 5/0031 |
| | | | | 600/561 |
| 2008/0251173 | A1* | 10/2008 | Cubizolle | B60C 23/064 |
| | | | | 152/152.1 |
| 2014/0343797 | A1 | 11/2014 | Naito et al. | |

FOREIGN PATENT DOCUMENTS

| | | | |
|---|---|---|---|
| CN | 101460321 | | 6/2009 |
| CN | 202879171 | | 4/2013 |
| CN | 203490024 | * | 3/2014 |
| CN | 104554274 | | 4/2015 |
| CN | 205365096 | * | 7/2016 |
| DE | 19924830 | | 11/2000 |
| DE | 102014005071 | * | 10/2015 |
| EP | 0505906 | | 9/1992 |
| EP | 0689950 | | 1/1996 |
| JP | 2002214060 | | 7/2002 |
| JP | 2004013399 | | 1/2004 |
| JP | 2007126026 | | 5/2007 |
| JP | 2010145277 | | 7/2010 |
| TW | M516516 | | 2/2016 |
| TW | M521003 | | 5/2016 |
| WO | WO 2005/002887 | * | 1/2005 |

OTHER PUBLICATIONS

Taiwan Patent Office "Search Report", dated Nov. 25, 2016, Taiwan.
Japan Patent Office "Office Action" dated Jun. 5, 2018, Japan.
State Intellectual Property Office, SIPO, "Office Action", dated Jan. 11, 2019.

* cited by examiner

SELF-MONITORING TIRE OF VEHICLE

FIELD OF THE INVENTION

The present invention relates to a tire of a vehicle, and more particularly to a self-monitoring tire of a vehicle.

BACKGROUND OF THE INVENTION

An unexpected tire condition is one of the most bothering and worrying problems for drivers, and it is usually hard for a driver to take prompt reaction to an emergent situation when a tire of a vehicle on the road goes wrong. For preventing or minimizing occurrence of unexpected tire conditions, a tire pressure monitoring system (TPMS) has been developed to automatically monitor whether the tire pressure is in a normal tire pressure range, and to dynamically detect whether air leakage from the tire happens or not.

Conventional tire-pressure monitoring systems include direct ones and indirect ones. An indirect tire-pressure monitoring system is implemented with a wheel speed sensor, and insufficient tire pressure is determined when a wheel speed difference exceeding a threshold happens among wheels of a vehicle. In contrast, a direct tire-pressure monitoring system is implemented with a pressure sensor installed onto each tire of a vehicle to detect individual tire pressure. The detected information is transmitted to a receiver around the driver seat to be monitored. Since the indirect tire-pressure monitoring system cannot show abnormal tire conditions for more than one tire at the same time, the direct tire-pressure monitoring system has been the mainstream of tire pressure monitoring techniques in the market so far.

Conventional direct tire-pressure monitoring systems include internal tire-pressure sensors and external tire-pressure sensors. An external tire-pressure sensor is installed onto a tire of a vehicle at a position where a gas nozzle cap is supposed to be onto a tire of a vehicle, while an internal tire-pressure sensor is installed into a tire of a vehicle. Thus, the internal tire-pressure sensor extends into a space between the tire and a corresponding rim, so the installation is uneasy. In contrast, the external tire-pressure sensor can be installed easily which being subject to damage or malfunction due to exposure to unpredictable environment.

SUMMARY OF THE INVENTION

Therefore, the present invention provides a tire-pressure monitoring system which is embedded in a tire without additional installation, and protected from environmental threats.

The present invention provides a self-monitoring tire, comprises a tire body and a tire pressure sensor. The tire body includes a tread rubber for contact with ground, a bead for coupling to a rim, and a sidewall structure including two portions disposed at opposite sides of the tread rubber, and extending from opposite sides of the tread rubber to the bead. The tire pressure sensor is disposed between respective outward surfaces of the two portions of the sidewall structure, and secured on or embedded in either one of the two portions of the sidewall structure.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. For example, the expressions relating to directions such as over, under, left and right, are presented with reference to the annexed drawings. It is not intended to be exhaustive or to be limited to the precise form disclosed.

Figure 1:
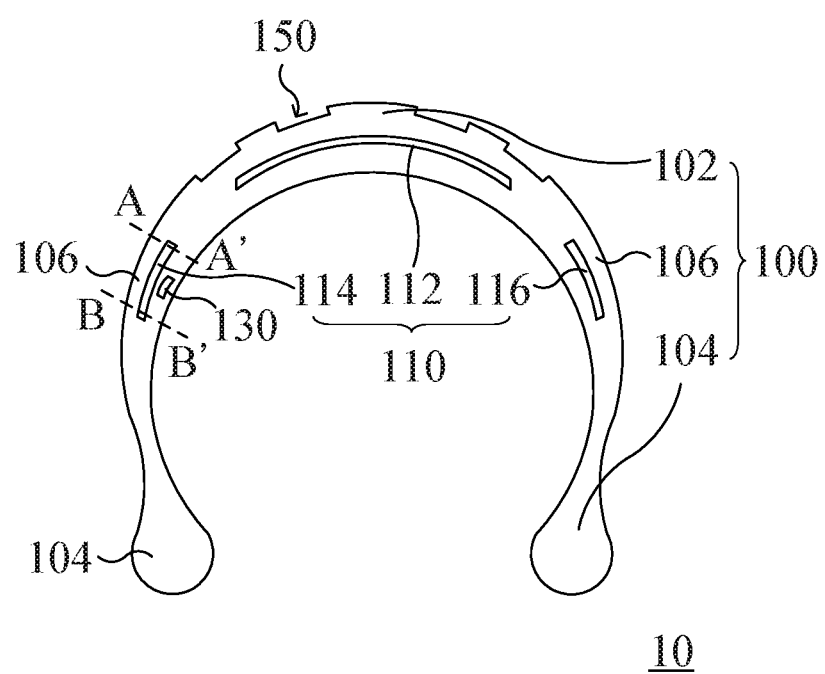
FIG. 1 is a schematic diagram illustrating an elevational cross-sectional view of a self-monitoring tire according to an embodiment of the present invention.

Please refer to FIG. 1, which schematically illustrates a self-monitoring tire according to an embodiment of the present invention. The tire 10 is used in a vehicle and includes a tire body 100, a wire layer 110 and a tire pressure sensor 130. The tire body 100 includes a tread rubber 102, a bead 104 and a sidewall structure 106. The tread rubber 102 has a tread pattern 150 in direct contact with ground when the vehicle is on the road. The bead 104 is coupled to a rim (not shown) to facilitate installation of the tire 10 onto the rim. The sidewall structure 106 includes two portions disposed at opposite sides of the tread rubber 102, and extends from opposite sides of the tread rubber 102 to the bead 104. The wire layer 110 is wrapped with the tire body 100, and includes a steel belt 112 disposed inside the tread rubber 102 and under the tread pattern 150, and carcass wire layers 114 and 116 disposed inside the portions of the sidewalls structure 106, respectively. The tire pressure sensor 130 is installed at the sidewall structure 106.

It should be noted that the position of the tire pressure sensor 130 shown in FIG. 1 is for illustration only. FIG. 1 is used for embodying the disposition of the tire pressure sensor 130 inside the sidewall structure 106, i.e. between a left side face of the left portion of the sidewall structure 106 and a right side face of the right portion of the sidewall structure 106. The examples of disposition of the tire pressure sensor to render different embodiments of the self-monitoring tire according to the present invention will be described in more detail with reference to FIGS. 3A-3D and 4.

Figure 2:
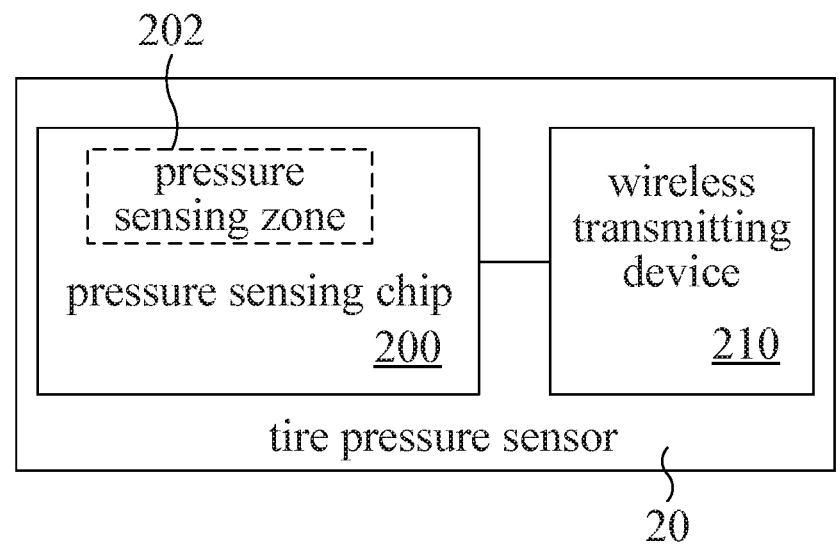
FIG. 2 is a circuit block diagram illustrating a tire pressure sensor used in a self-monitoring tire according to an embodiment of the present invention.

Please refer to FIG. 2, which schematically shows a circuit block diagram of the tire pressure sensor 130 as shown in FIG. 1. In this embodiment, the tire pressure sensor 20 is implemented with a circuit board 20 on which a pressure sensing chip 200 and a wireless transmitting device 210 are installed. For detecting a pressure imposed on the tire by the environment, a pressure sensing zone 202 is reserved on the pressure sensing chip 200, and in response to a pressure imposed on the pressure sensing zone 202, a pressure information is generated. The pressure information, after being processed by the pressure sensing chip 200, is converted into a set of electronic data. The wireless transmitting device 210 is electrically coupled to the pressure sensing chip 200, receives the electronic data from the pressure sensing chip 200, and transmits the electronic data outwards in a wireless manner. The circuit board 20 for carrying the pressure sensing chip 200 and the wireless transmitting device 210 may be a general printed circuit board (PCB) or a flexible PCB.

Figure 3A:
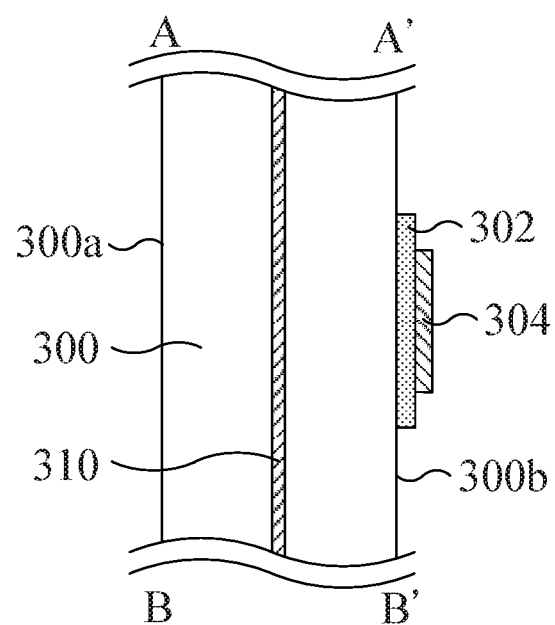
FIG. 3A is a schematic diagram illustrating disposition of a tire pressure sensor in a self-monitoring tire according to an embodiment of the present invention.
Figure 3B:
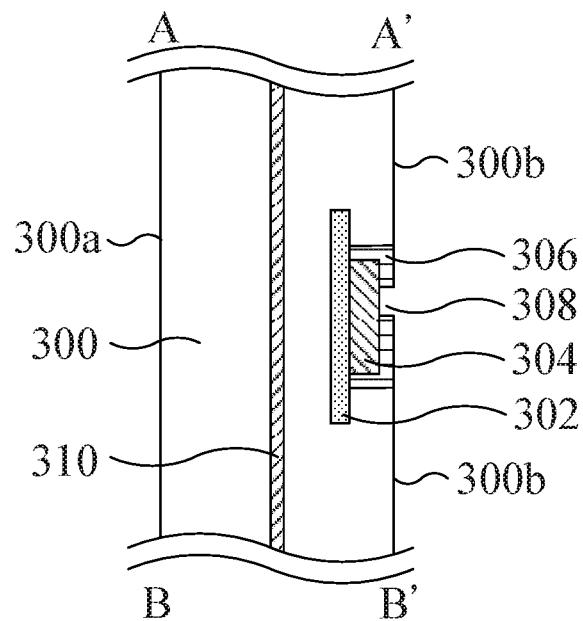
FIG. 3B is a schematic diagram illustrating disposition of a tire pressure sensor in a self-monitoring tire according to another embodiment of the present invention.
Figure 3C:
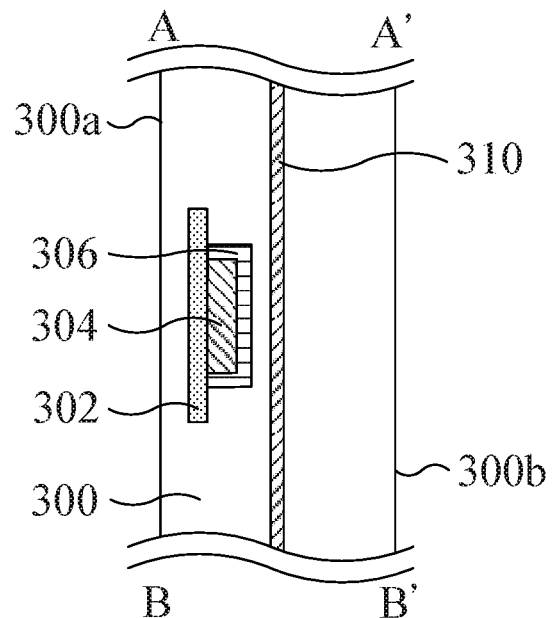
FIG. 3C is a schematic diagram illustrating disposition of a tire pressure sensor in a self-monitoring tire according to a further embodiment of the present invention.

Hereinafter, FIGS. 3A, 3B and 3C schematically illustrate different disposition examples of a tire pressure sensor in a self-monitoring tire according to the present invention. The cross-sectional views of FIGS. 3A, 3B and 3C are taken from a portion between the AA' line and the BB' line. For focusing on the implementation of the tire pressure sensor according to the present invention, only relative positions of sidewall structure 300, wire layer 310, PCB 302 and tire pressure sensor including PCB 302 and pressure sensor chip 304 are shown in the figures.

As shown in the example of FIG. 3A, the sidewall structure 300 includes an outward surface 300a and an inward surface 300b. The wire layer 310 is embedded into the sidewall structure 300 between the outward surface 300a and the inward surface 300b. The PCB 302 and pressure sensor chip 304 of the tire pressure sensor are secured onto the inward surface 300b of the sidewall structure 300. The outward surface 300a as described above is the surface where the sidewall structure 300 contacts an environmental object, while the inward surface 300b is the surface where the sidewall structure 300 contacts an inner tube (not shown) or filling gas inside the tire body. In this embodiment, the tire pressure sensor can readily sense the pressure imposed thereon by the inner tube or filling gas inside the tire body, and transmit the pressure information to a corresponding receiver, e.g. a tire pressure display of the vehicle (not shown).

The embodiment as shown in FIG. 3B is similar to that as shown in FIG. 3A. For example, the sidewall structure 300 includes an outward surface 300a and an inward surface 300b, and the wire layer 310 is embedded into the sidewall structure 300 between the outward surface 300a and the inward surface 300b. This embodiment differs from the embodiment of FIG. 3A in that the PCB 302 and pressure sensor chip 304 of the tire pressure sensor are embedded in the sidewall structure 300 between the wire layer 310 and the inward surface 300b of the sidewall structure 300. In addition, a protective layer 306 overlying the entire pressure sensing chip 304 and partial or entire PCB 302, and a gas tunnel 308 for free gas flow are provided. The gas tunnel 308 penetrates through the protective later 306 so as to allow the gas inside the tire to reach the pressure sensing chip 304, e.g. the pressure sensing zone 202 as illustrated in FIG. 2. Since the pressure sensing chip 304 and the circuit board 302 are covered and protected with the protective layer 306, material for producing the sidewall structure 300 would not contact the protected parts of the pressure sensing chip 304 and the circuit board 302 during the manufacturing process of the tire. Since the gas tunnel 308 is uncovered from the inward surface 300b and the gas pressure inside the gas tunnel 308 always keeps balanced with the pressure inside the tire, the pressure sensing chip 304 covered by the protective layer 306 can still detect tire pressure via the gas tunnel 308.

The embodiment as shown in FIG. 3C is similar to that as shown in FIG. 3B. For example, the sidewall structure 300 includes an outward surface 300a and an inward surface 300b, and the wire layer 310 is embedded into the sidewall structure 300 between the outward surface 300a and the inward surface 300b. The sidewall structure 300 in this embodiment also includes a protective layer 306, which not only protects the entire pressure sensing chip 304 but also protect partial or entire PCB 302. This embodiment differs from the embodiment of FIG. 3B in a few aspects. First of all, in this embodiment, a deformation detector, which detects a deforming degree of the sidewall structure 300 of a tire is used as the pressure sensing chip 304. As known, the sidewall structure 300 is subject to deformation due to a tire pressure, and the deforming degree of the sidewall structure 300 varies with the level of the tire pressure. Therefore, the tire pressure can be monitored by detecting a deforming degree of the sidewall structure or a member integrated with the sidewall structure 300, e.g. the circuit board 302 or the protective layer 306. For example, an oscillation circuit of the PCB 302 may function for sensing the deforming degree. When deformation occur, the oscillating frequency of the oscillating circuit will change, and the oscillating frequency change corresponds to a change of the tire pressure. In another example, distributed impedance is adapted for sensing the deforming degree. When deformation occurs so as to change current cross area, equivalent impedance will change accordingly to result in a different electric level, and the equivalent impedance change corresponds to a change of the tire pressure. In addition, in this embodiment, no gas tunnel is provided for tire pressure sensing because the tire pressure sensing in this embodiment is not conducted by detecting the gas pressure inside the tire directly. Nevertheless, a gas tunnel may still be reserved for providing a space for a deforming structure so as to protect the circuit board 302. Furthermore, without considering a gas tunnel, the tire pressure sensor may be disposed at any place of the sidewall structure and may face any direction. For example, in the embodiment shown in FIG. 3C, the tire pressure sensor is disposed between the wire layer 310 and the outward surface 300a of the sidewall structure 300, and has the pressure sensing chip 304 and the protective layer 306 disposed between the circuit board 302 and the wire layer 310. Alternatively, the position is not limited and the orientation may be changed, e.g. to have the circuit board 302 closer to the wire layer 310 than the pressure sensing chip 304 and the protecting layer 306.

Figure 3D:
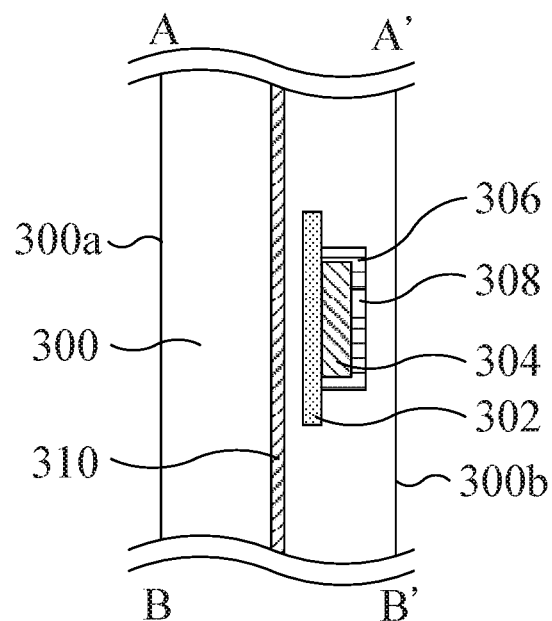
FIG. 3D is a schematic diagram illustrating disposition of a tire pressure sensor in a self-monitoring tire according to a further embodiment of the present invention.

The embodiment as shown in FIG. 3D is also similar to that as shown in FIG. 3B. For example, the sidewall structure 300 includes an outward surface 300a and an inward surface 300b, and the wire layer 310 is embedded into the sidewall structure 300 between the outward surface 300a and the inward surface 300b. The sidewall structure 300 in this embodiment also includes a protective layer 306, which not only protects the entire pressure sensing chip 304 but also protect partial or entire PCB 302. The embodiment as shown in FIG. 3D is different from the embodiment as shown in FIG. 3B in that the gas tunnel 308 is sealed in the sidewall structure 300 without free gas flow to or from the inner room of the tire. Therefore, the tire pressure sensing is not conducted by detecting the gas pressure inside the tire directly. Instead, the tire pressure sensing is conducted by detecting the pressure of the gas existing in the sealed gas tunnel 308. Since the pressure in the gas tunnel 308 may change due to the compression of the sidewall structure 300, e.g. the shift of the inward surface 300b resulting from the tire pressure change inside the tire, the pressure of the gas existing in the sealed gas tunnel 308 can reflect the tire pressure inside the tire.

Figure 4:
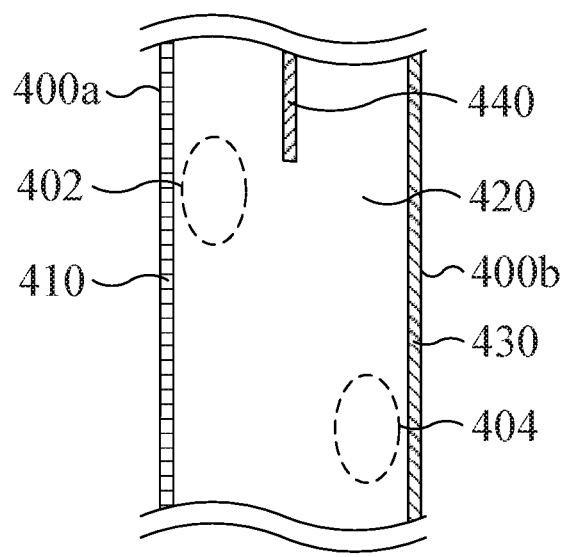
FIG. 4 is a schematic diagram illustrating disposition of a tire pressure sensor in a self-monitoring tire according to still another embodiment of the present invention.

Please refer to FIG. 4, in which disposition of a tire pressure sensor in a self-monitoring tire according to still another embodiment of the present invention is illustrated. In this embodiment, the sidewall structure 400 of the tire includes a sidewall rubber 410 having a surface serving as an outward surface 400a of the sidewall structure 400, a polyester layer 420 and an inner liner 430 having a surface serving as an inward surface 400b of the sidewall structure 400. The tire pressure sensor can be disposed at any proper position of the sidewall structure 400 between the outward surface 400a and the inward surface 400b. For example, the tire pressure sensor as shown in FIG. 3C may be used in this embodiment and installed at a zone 402 or any other suitable position between the sidewall rubber 410 and the polyester layer 420. Alternatively, the tire pressure sensor as shown in FIG. 3B or FIG. 3C may be used in this embodiment and installed at a zone 404 or any other suitable position between the inner liner 430 and the polyester layer 420. Furthermore, the tire pressure sensor has a distance from the wire layer 440, which varies with practical designs.

According to the present invention and referring to FIG. 1, the tire pressure sensor is disposed between respective exterior faces of the two portions of the sidewall structure 106 and securely embedded in either one of the portions of sidewall structure 106. The tire pressure sensor may include, in addition to the pressure sensing chip and the wireless transmitting device installed on a PCB, other sensing means for facilitating vehicular operations, e.g. a thermos sensor or a g-sensor. The additional sensing means may also be electrically coupled to the wireless transmitting device, thereby transmitting the sensing results, e.g. temperature or gravity variations, to the corresponding receivers outside the tire. The wireless transmitting device, for example, may be an electromagnetic transmitter or a sonic transmitter. The PCB described above may be a circuit board manufactured by three-dimensional printing. If the PCB is disposed closely enough to an outward surface of the tire, the tire pressure can be estimated by detecting the deforming degree of the tire.

For improving wireless transmitting capability, according to an embodiment of the present invention, the wire layer of the tire body, which includes a steel belt and other steel wires, may additionally function as a part of an antenna of the wireless transmitting device. Practical antenna designs should take many factors such as positions, configurations, clearances and orientations into considerations. Furthermore, the wire layer may be used as an induction coil or antenna of a wireless recharger for supplying power to the tire pressure sensor or supplying power to another device from which the tire pressure is powered.

To sum up, with the tire pressure sensor built in the tire according to the present invention, the tire pressure can be self-monitored without additional installation. If the tire pressure sensor is disposed inside the tire body and secured onto the sidewall structure, the impact of the environment on the tire pressure sensor can be minimized so as to avoid damage. Moreover, additional information, e.g. tire producing history, new tire information, or reproduced tire information, may be recorded in the tire pressure sensor and accessed for tire safety diagnosis.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures. For example, in spite hardware devices are exemplified as above in order to practice the redundancy power supply system and the power control circuit according to the present invention, hardware/software hybrid modules or firmware designs may also adopted as alternatives of the devices when appropriate.

What is claimed is:

1. A self-monitoring tire, comprising:
a tire body, comprising:
  a tread rubber for contact with ground;
  a bead for coupling to a rim; and
  a sidewall structure including two portions disposed at opposite sides of the tread rubber, and extending from opposite sides of the tread rubber to the bead; and
  a tire pressure sensor disposed between respective outward surfaces of the two portions of the sidewall structure, and embedded in either one of the two portions of the sidewall structure, wherein the tire pressure sensor has a gas tunnel, which is sealed in a selected one of the two portions of the sidewall structure at an inward surface of the selected portion of the sidewall structure without free gas flow to or from an inner room of the tire, and tire pressure sensing is conducted by detecting gas pressure existing in the sealed gas tunnel.

2. The tire according to claim 1, further comprising a wire layer embedded in the tire body, wherein the tire pressure sensor is disposed between an inward surface of either one of the two portions of the sidewall structure and the wire layer, or the tire pressure sensor is disposed between an outward surface of the either one of the two portions of the sidewall structure and the wire layer.

3. The tire according to claim 2, wherein the tire pressure sensor includes:
a circuit board;
a pressure sensing chip disposed on the circuit board and having a pressure sensing zone where a pressure is detected;
a protective layer covering the pressure sensing chip and at least partially the circuit board, and reserving a gas tunnel in communication with the pressure sensing zone; and
a wireless transmitting device electrically coupled to the circuit board and having an antenna for wirelessly transmitting out an information associated with the pressure detected in the pressure sensing zone.

4. The tire according to claim 2, wherein the wire layer functions as a part of the antenna of the wireless transmitting device.

5. The tire according to claim 1, further comprising a wire layer embedded in the tire body.

6. The tire according to claim 5, wherein the wire layer functions as a part of the antenna of the wireless transmitting device.

* * * * *